United States Patent
Wolf et al.

(10) Patent No.: US 12,045,152 B2
(45) Date of Patent: Jul. 23, 2024

(54) PREVENTION OF MALICIOUS END POINT BEHAVIOR THROUGH STATEFUL RULES

(71) Applicant: Elasticsearch B.V., Mountain View, CA (US)

(72) Inventors: Ross David Wolf, Denver, CO (US); Nicholas Charles Berlin, Eldersburg, MD (US); Brian Douglas McKinney, San Antonio, TX (US)

(73) Assignee: Elasticsearch B.V., Amsterdam (NL)

( * ) Notice: Subject to any disclaimer, the term of this patent is extended or adjusted under 35 U.S.C. 154(b) by 192 days.

(21) Appl. No.: 17/506,544

(22) Filed: Oct. 20, 2021

(65) Prior Publication Data
US 2023/0123509 A1   Apr. 20, 2023

(51) Int. Cl.
*G06F 11/30* (2006.01)
*G06F 9/50* (2006.01)
*G06F 9/54* (2006.01)
*G06F 21/57* (2013.01)

(52) U.S. Cl.
CPC ........ *G06F 11/3072* (2013.01); *G06F 9/5022* (2013.01); *G06F 9/542* (2013.01); *G06F 21/577* (2013.01); *G06F 2201/835* (2013.01); *G06F 2201/86* (2013.01)

(58) Field of Classification Search
CPC ............. G06F 11/3072; G06F 11/3065; G06F 9/5022; G06F 9/542; G06F 21/577
USPC ......................................................... 714/45
See application file for complete search history.

(56) References Cited

U.S. PATENT DOCUMENTS

| | | | |
|---|---|---|---|
| 8,370,931 B1 * | 2/2013 | Chien .................. | G06F 21/566 709/224 |
| 2013/0121580 A1 | 5/2013 | Chen et al. | |
| 2014/0208427 A1 * | 7/2014 | Grier .................. | H04L 63/1416 726/23 |
| 2019/0073677 A1 * | 3/2019 | Isaiah ..................... | G06F 21/60 |
| 2020/0021620 A1 | 1/2020 | Purathepparambil et al. | |
| 2020/0065303 A1 | 2/2020 | Bhattacharjee et al. | |
| 2021/0067531 A1 * | 3/2021 | Meir ..................... | G06F 21/552 |
| 2021/0099483 A1 * | 4/2021 | Shukla .................. | G06F 21/566 |
| 2021/0266339 A1 * | 8/2021 | Moshitzky .......... | H04L 63/0263 |
| 2022/0350804 A1 * | 11/2022 | Leau ................. | G06F 16/24553 |

FOREIGN PATENT DOCUMENTS

CN            112242991 A        1/2021

* cited by examiner

*Primary Examiner* — Chae M Ko
(74) *Attorney, Agent, or Firm* — Quinn IP Law

(57) ABSTRACT

Provided are methods and systems for preventing malicious behavior of an end point. An example method commences with monitoring a stream of events associated with the end point. The method further includes processing the stream to record a set of events to a memory. Processing an event of the stream includes determining that the event satisfies at least one rule in a sequence of rules and, in response to the determination, adding the event to the set of events in the memory. The method further includes determining that the set of events includes a sequence of events. Each state in the sequence of events corresponds to at least one rule in the sequence of rules. The method continues with executing at least one action on the end point in response to the determination that the set of events includes the sequence of events.

20 Claims, 6 Drawing Sheets

210

```
sequence by field_foo with maxspan=30s
  [ event_category_1 where condition_1 ]
  [ event_category_2 where condition_2 ]
  ...
until [ event_category_n where
condition_n ]
```

220

Sequence
Rule A
Rule B
Rule C

230

A1  A2   A6
B0   B3  B5  B7
C1    C4  C6  C8

[results matching Rule A]
[results matching Rule B]
[results matching Rule C]

→ Time

PREVENTION OF MALICIOUS END POINT BEHAVIOR THROUGH STATEFUL RULES

TECHNICAL FIELD

This disclosure relates to computer security. More specifically, this disclosure relates to systems and methods for preventing malicious behavior of end points through stateful rules.

BACKGROUND

An analysis of real time data of end point computer systems can reveal potential security risks and breaches. Typically, existing technologies in this field are limited to detecting specific events related to security breaches without correlating the events with each other. Another drawback of the existing technologies is that the log data associated with end points are sent to remote systems that perform analysis of the data in a batch mode rather than in real time. Thus, there is a delay between the time an event occurs on an end-point and the time an issue associated with the event is detected.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to systems and methods for preventing malicious behavior of end points. Embodiments of the present disclosure allow analyzing log data of an operational system of an end point in real time to detect events correlated to each other. Specifically, embodiments of the present disclosure allow performing real time analysis of the log data based on a sequence of rules, where each rule can be used to recognize a specific event.

According to one example embodiment of the present disclosure, a method for preventing malicious behavior of an end point is provided. The method may commence with monitoring a stream of events associated with the end point. The end point may include one of the following: a personal computer, a server, a network device, an Internet-of-Things device, and so forth. The method may further include processing the stream to record a set of events to a memory. Processing an event of the stream may include determining that the event satisfies at least one rule in a sequence of rules and, in response to the determination, adding the event to the set of events in the memory. Prior to processing of the events, the events can be enriched with information concerning a process associated with the event.

The method may further include determining that the set of events includes a sequence of events. Each state in the sequence of events can correspond to at least one rule in the sequence of rules. Events in the sequence of events may be ordered by timestamps corresponding to the events and an order of the events in the sequence of events may correspond to an order of rules in the sequence of rules. The event may include one or more of the following: an attempt to access a computing system via a port, an indication that a process started on the end point, an indication of starting a new network connection to another computing system, and one of an opening, creating, modifying a file on the end point, and so forth.

The method may continue with executing at least one action on the end point in response to the determination that the set of events includes the sequence of events. At least one action may include one or more of the following: shutting down a process on the end point, deleting a file on the end point, issuing an alert message, generating a report based on the sequence of events, and so forth.

In some example embodiments, prior to execution of at least one action, fields may be extracted from events in the sequence of events and further fields can be extracted from rules in the sequence of rules. Based on the fields and the further fields, a type of the at least one action can be determined.

The method may, optionally, include determining that the set of events includes a first event and a second event. The first event and the second event may be the same and may correspond to different rules of the sequence of rules. In response to the determination that the set of events includes the first event and the second event, a part of the memory allocated for the first event or the second event can be released.

The method may optionally include determining that a size of a part of memory allocated for a subset of the set of events exceeds a predetermined threshold. The subset may include events corresponding to the same rule of the sequence of rules. In response to this determination, the oldest event in the subset may be removed from the set of events and a portion of the memory allocated for the oldest event can be released.

According to another embodiment, a system for preventing malicious behavior of an end point is provided. The system may include at least one processor and a memory storing processor-executable codes, wherein the processor can be configured to implement the operations of the above-mentioned method for preventing malicious behavior of an end point.

According to yet another aspect of the disclosure, there is provided a non-transitory processor-readable medium, which stores processor-readable instructions. When the processor-readable instructions are executed by a processor, they cause the processor to implement the above-mentioned method for preventing malicious behavior of an end point.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

FIG. 2 are schematics showing sets of rules, an event corresponding to individual rules, and an example result of an event sequence search, according to some example embodiments.

DETAILED DESCRIPTION

Figure 1:
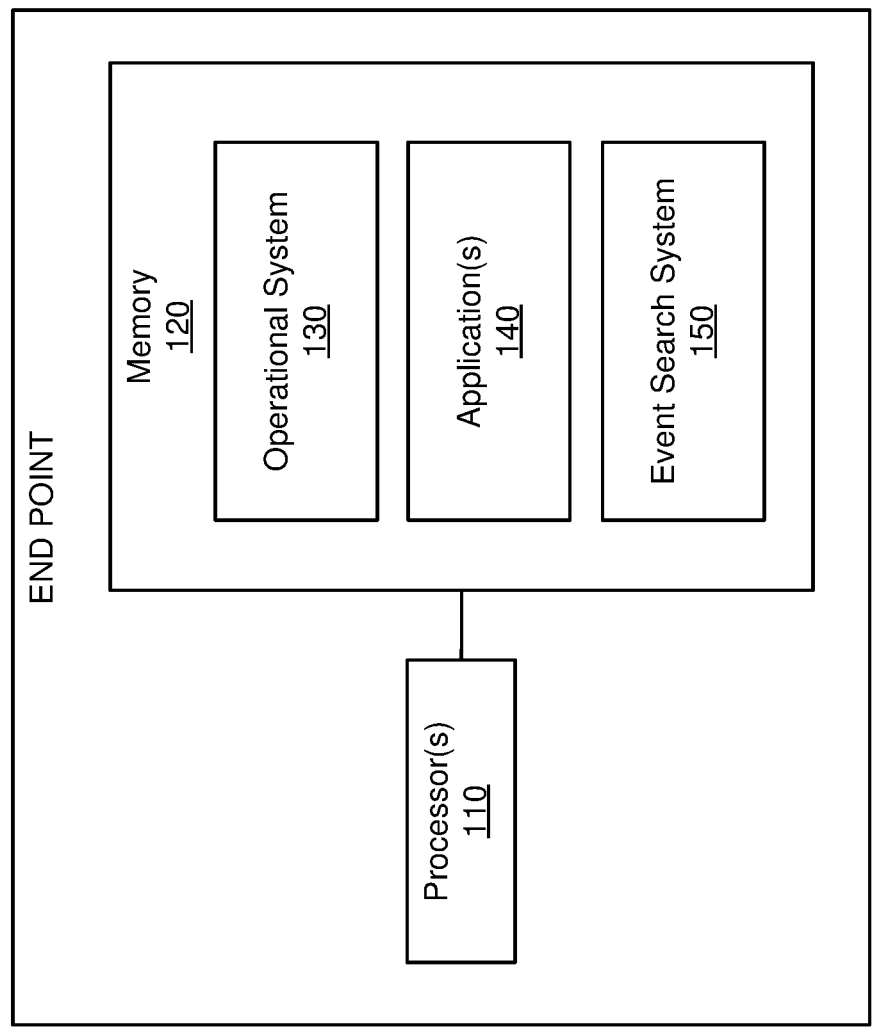
FIG. 1 is a block diagram of an example end point suitable for practicing methods for preventing malicious behavior of an end point as described herein.

The present disclosure provides a system and a method for preventing malicious behavior of an end point. The system and method described herein address the issue of detecting and stopping malicious activity on end points to prevent further damage. An example system includes a rules engine that tracks states across events of different types, which are streamed from an operating system of the end point in real time, and carries out automatic mitigating actions when a match to the rules is found, allowing prevention of malicious behaviors instantly upon detection.

Thus, the system described herein ensures preventing malicious threats that cannot be detected in a single event or a single point in time. Instead, the system allows by monitoring a behavior that unfolds over various discrete events. Thus, the rules engine of the system enables monitoring malicious activity for a long period of time and taking an action upon occurrence of the final event in the event chain with a malicious activity. Therefore, instead of attempting to classify and terminate a malicious process upon its creation (which could be impossible), the malicious process can be terminated after it has run for some time and has been classified as malicious based on its behavior.

Specifically, events are streamed from the operating system of the end point in real-time, statefully enriched with process information, and sent to the rules engine for stateful analysis in real time. On the rules engine, rules can be written, for example, in Event Query Language (EQL) and events can be stored as a state (partial sequences) to be used in an analysis of future events. The events that take part in the state changes are tracked, such that when an end state is eventually reached, an alert is generated with the full trace of events that resulted in the end state and are responsible for the malicious activity. Once the alert is generated, the relevant response actions are determined by extracting fields from the event and the rule. By taking the proper mitigating actions automatically and with low latency (i.e., a high speed of detection of malicious activity), the system can prevent further malicious activity from happening.

While tracking states for future analysis, a memory footprint can be tracked in aggregate for all rules, and on an individual per-rule level. When memory limits are reached, the oldest state is evicted from the rules with the highest memory footprint. This careful model of memory management keeps latency, memory usage, and Central Processing Unit (CPU) overhead low with a minimum degradation in rule efficacy.

Typically, conventional rule-based event tracking systems provide one of two choices. The first choice is to have only filter-based rules, according to which rules cannot track states and are simply Boolean matches on a single event at a time, with no context or relationships between other events. The second choice is to have a limited set of options to connect disparate events, and when an alert is generated, the alert does not provide any trace of the offending events. The system of the present disclosure with an EQL-based detection engine (also referred to as the rules engine) overcomes the problems of these conventional approaches and provides expressibility in the matching logic, explainability with the event traces, and customizable response actions.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example end point 100 suitable for practicing methods described herein. It should be noted, however, that the end point 100 is just one example and is a simplified embodiment provided for illustrative purposes, and reasonable deviations of this embodiment are possible as will be evident to those skilled in the art.

As shown in FIG. 1, the end point 100 may include one or more processors 110 and a memory 120 communicatively coupled to the one or more processors 110. The end point 100 may further include an operational system 130, one or more applications 140, and an event search system 150. The operational system 120, the one or more applications 140, and the event search system 150 may be stored in the memory 120.

In various embodiments, the end point 100 may include, but is not limited to, a laptop computer, a tablet computer, a desktop computer, a server, a network device, a router, an Internet-of-Things (IoT) device, a smart phone, and so forth.

In an example embodiment, the one or more processors 110 may be configured to monitor, in real time, a stream of events associated with the end point 100. The one or more processors 110 may process the stream to record a set of events to a memory. Processing each event of the stream may include determining that the event satisfies at least one rule in a sequence of rules and, in response to the determination, adding the event to the set of events in the memory.

The one or more processors 110 may determine that the set of events includes a sequence of events. Each state in the sequence of events may correspond to at least one rule in the sequence of rules. In response to the determination that the set of events includes a sequence of events, the one or more processors 110 may execute at least one action on the end point 100.

In a further example embodiment, the steps described above as performed by the one or more processors 110, can be performed by the system for preventing malicious behavior of an end point. The system may reside remotely from the end point 100.

FIG. 2 depicts schematics showing example sequences of rules 210 and 220, example results 230 of executing the sequences of rules, and an example result 240 of event sequence search, according to some example embodiments.

The sequence of rules 210 is an example of rules written in EQL as EQL rules. The rules are written to identify events that meet predetermined criteria. In response to the EQL rule, the system for preventing malicious behavior of an end point (also referred to as the system) returns data ordered by time (a timestamp) in ascending order.

The EQL rule may include a sequence of rules. The system may find events in one or more datasets that match each rule in the sequence and located sequentially in order declared in the EQL rule. The sequence may provide for correlation between rules through join keys. The EQL rule may also allow scoping of a sequence through the maxspan field. The maxspan may indicate that all matches should occur within the given time span or until the specified condition matches. The maxspan defines a time limit in which the matches need to be found. Maxspan can range from milliseconds to days. The event search system may check the maxspan each time a new item is added to a result sequence. Accordingly, each time a new element is added to the result sequence, the event search system computes how much time has passed from the start of the sequence and, if this time is less than maxspan, keeps the new element in the result sequence.

The example rule 220 includes a sequence of three rules denoted as Rule A, Rule B, and Rule C. Results of matching individual rules over the dataset are shown as results 230. Each of the rules A, B, and C is matched to more than one events Ai, Bi, and Ci, respectively, where index i represents a time stamp at which the event occurs. The result of the execution of the rule 220 is shown as result 240. The result 240 includes only two event sequences: [A2, B3, C4] and [A6, B7, C8]. The result 240 can be determined based on time stamps of events by a state machine within the event search system 150. The state machine may perform the following steps:

0: B0—there is no A preceding B0 (stage A) so B is ignored.

1: A1 C1→[A1] is found (stage A), the state machine advances to stage B and C is ignored because no stage B is found yet.

2: A2 is found→[A2] is found (stage A) and the state machine expects a B. Previously found [A1] is overwritten with A2.

3: B3 is found→matches stage B so [A2, B3] sequence advances.

4: C4 is found→matches stage C so [A2, B3, C4] sequence advances and completes.

5. B5 is found→no stage A exists, so the B5 is ignored.

6. A6, C6→no stage B, C6 is ignored, A6 matches, so A6 is remembered, and the B rule is issued.

7. B7 is found→matches A6→[A6, B7].

8. C8 is found→matches stage C→[A6, B7, C8].

The other potential sequences, such as [A1, B3, C4], [A1, B3, C6], [A2, B5, C8] are considered to be incorrect.

Figure 3:
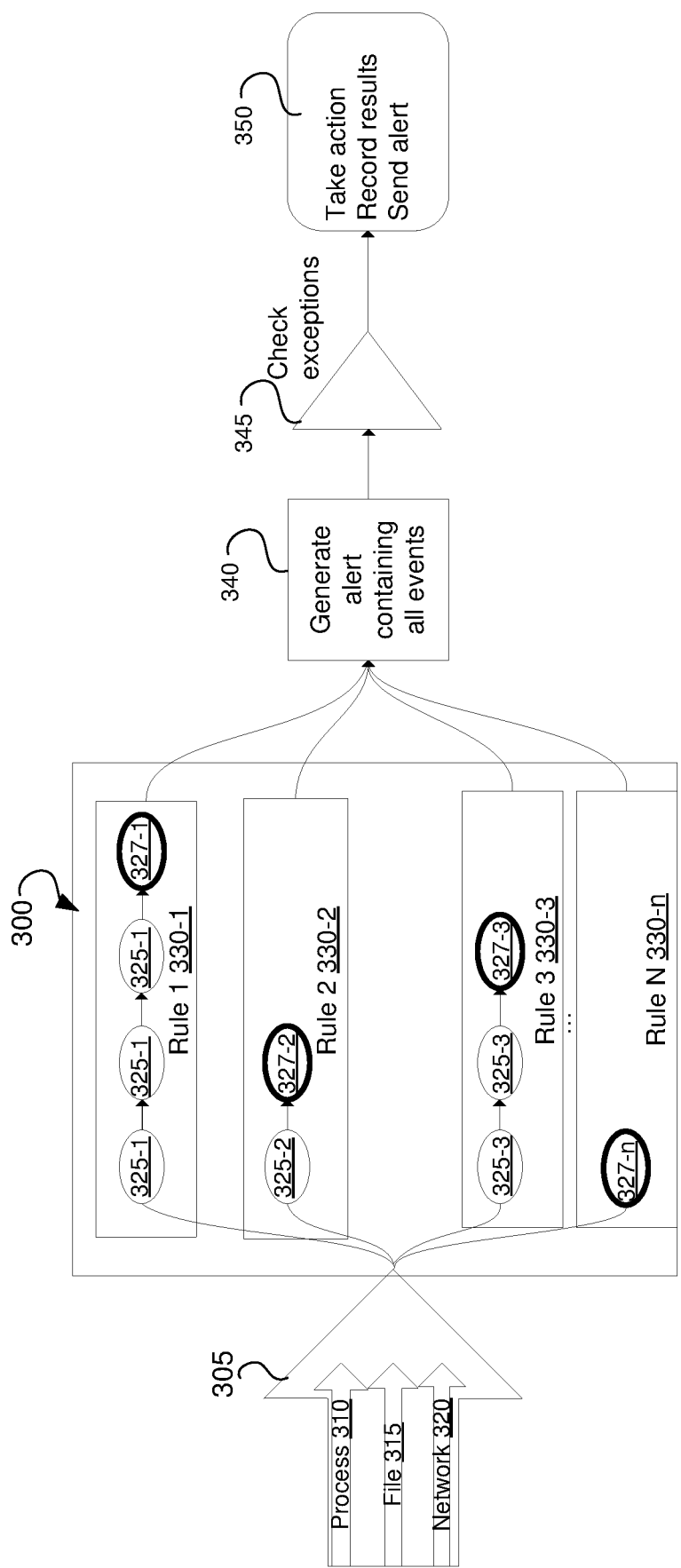
FIG. 3 is a schematic showing functionality of a system for preventing malicious behavior of an end point, according to some example embodiments.

FIG. 3 is a schematic showing functionality of an event search system 300, according to some example embodiments. The event search system 300 may act as a rules engine of the system for preventing malicious behavior of an end point. The event search system 300 monitors, in real time, a stream 305 of events associated with the end point. The events can be associated with a kernel of the operational system of an end point, a user associated with a user device, a device, and so forth. The stream 305 may include events generated by processes 310, files 315, a network 320, and other entities associated with the end point.

Rules 330-$n$ in a sequence of rules 330-$i$ (i=1, . . . , n) are EQL sequence rules. Events can be stored as states 325-$i$ (i=1, . . . , n) (partial sequences) and used to analyze future events. The events that take part in changes of a state 325-$i$ are tracked. In particular, the stream 305 is processed to record a set of events to a memory. Specifically, the stream 305 is processed by processing each event stored as the state 325-$i$ (i=1, . . . , n) in the stream 305. The processing of the event includes determining that the event satisfies at least one rule in a sequence of rules 330-$i$ (i=1, . . . , n) and, in response to the determination, adding the event 325-$i$ to the set of events in the memory. Then, the event search system 300 determines that the set of events includes a sequence of events (states) 327-$i$ (n=1, . . . , n), in which each state 327-$i$ (n=1, . . . , n) in the sequence of events corresponds to at least one rule 330-$i$ (i=1, . . . , n) in the sequence of rules. Events 327-$i$ (n=1, . . . , n) in the sequence of events may be ordered by timestamps corresponding to the events. An order of the events in the sequence of events may correspond to an order of rules 330-$i$ (i=1, . . . , n) in the sequence of rules 330-$i$ (i=1, . . . , n).

When the sequence of events 327-$i$ (n=1, . . . , n) is eventually detected, an alert is generated (as shown in block 340). The alert includes a full set of events responsible for changing the states 325-$i$ and reaching the end states 327-$i$.

The event search system 300 may further check for exceptions in block 345 to identify, based on predetermined criteria, any events that do need to be restricted. In an example embodiment, the alert may be enriched with information related to the events and other information concerning a process associated with the events as provided to a user. The user may be a user of the end point, an administrator of a network to which the end point is connected, or any other person or entity. The user may review the alert and provide one or more exceptions, e.g., by identifying the behavior as benign, marking a process as non-malicious if the process is within the limits of some predetermined criteria, and the like.

In response to the alert, an action is executed on the end point, as shown in block 350. The relevant response action may be determined based on fields extracted from the event and the rule. Specifically, fields may be extracted from events in the sequence of events and further fields may be extracted from rules in the sequence of rules. A type of the action may be determined based on the fields and the further fields.

The event search system 300 may also record the results of stream monitoring to the memory and send the alert to an appropriate party. In an example embodiment, the action may include shutting down a process on the end point, deleting a file on the end point, issuing an alert message, generating a report based on the sequence of events, quarantine a file of the end point (e.g., by moving the file to a place inaccessible to other users of the system), isolating a host, adding a corporate firewall rule, and so forth.

In an example embodiment, the event search system 300 monitors the end point based on a set of rules. The end point may have a process running on the end machine. The process may perform a certain action (state 1), the action may access a command line and initiate a child process (state 2), and the child process may make a network connection (state 3). Thus, none of the states 1-3 in isolation is malicious, but the system monitors progressing through states 1 to 3, tracks all the events that were responsible for each state change, and determines whether this set of events resulted in malicious activity (the network connection not allowed for the process). Other example events associated with states predetermined in rules as malicious may include an attempt to access a computing system via a port, an indication of a process started on the end point, an indication of starting a new network connection to another computing system, opening, creating, or modifying of a file on the end point, and so forth.

In an example embodiment, the alert may be enriched with a set of data related to the states and events associated with the network connection (final state 3, malicious).

Therefore, the action to be taken may be selected based on the set of data for these states and events.

Thus, the event search system 300 of the present disclosure provides for configurable rules that span multiple events and trigger dynamic response actions. As a result, the system may monitor malicious activity for a long period of time and wait to take a response action until a final event in the sequence of events that makes the activity malicious occurs. The whole sequence of events detected as making the activity malicious is stored to be used in analysis of future events.

Figure 4:
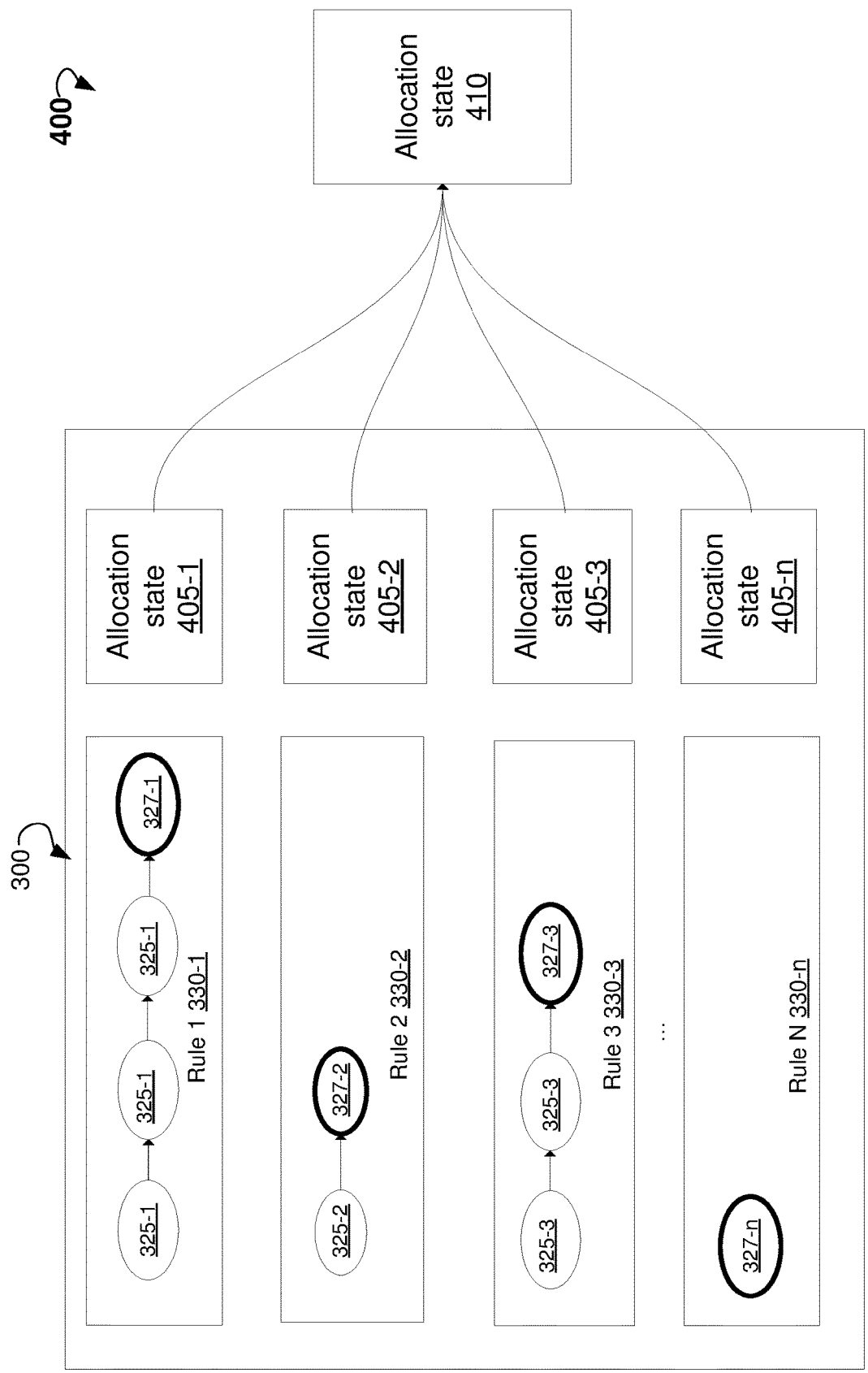
FIG. 4 is a schematic showing memory allocation of a system for preventing malicious behavior of an end point, according to some example embodiments.

FIG. 4 is a schematic 400 showing memory allocation of an event search system 300, according to some example embodiments. In an example embodiment, security teams of organizations may use the event search system 300 to monitor the stream of events in an organization network. The event search system 300 may enable users of the organizations to create their own rules specific to the organization, or behavior-specific to a risk posture, and the like. However, the rules created by users may result in collecting large amounts of events and states and, thereby, occupy large amounts of memory. As the event search system 300 cannot control input that a user of the event search system 300 may provide for the rule, the amount of memory occupied by events and states stored based on the rules may be very large and grow exponentially. For example, a particular rule may collect a large amount of recorded states and, thus, occupy a large amount of memory. To make the event search system 300 open to users who may or may not be experts in all the system internals and avoid running machines of the organization network into an inoperable state, the event search system 300 can perform memory management. Specifically, the event search system 300 can control the amount of memory used by the rules and continually keep the amount of the memory occupied by events and states below a predetermined threshold.

A memory footprint (memory usage) of each rule 330-$n$ may be known. The event search system 300 keeps track, at any point in time, of the amount of memory each rule 330-$n$ uses (including the portion of memory shared by several rules 330-$n$), shown as allocation states 405-$n$. The event search system 300 can also keep track, at any point in time, of the total amount of memory used across all rules 330-$n$ (a shared memory only counted once), shown as an allocation state 410. Moreover, the event search system 300 can determine, at any point in time, time each state exists (i.e., how old each piece of state is). The states are tracked within individual rules 330-$n$. In other words, the allocation state is how much the memory is far from thresholds per rule (the allocation states 405-$n$ for each of rules 330-$n$) and form an overall threshold for overall memory (the allocation state 410 for all rules 330-$n$). Therefore, the event search system 300 monitors the allocation state 405-$n$ individually for each rule 330-$n$ and monitors the allocation state 410-$n$ (overall memory) for all rules 330-$n$ together.

The event search system 300 uses the allocation states 405-$n$ and the allocation state 410-$n$ for memory allocation. In an example embodiment, the memory allocation may be performed by cleaning old events from the memory. The automatic memory allocation may be performed as follows. The event search system 300 may know a predetermined threshold (i.e., a hard upper bound) for the memory and a minimum amount of the memory to free when the predetermined threshold is reached. For example, the predetermined threshold may be 25 MB limit, upon reaching of which, at least 5 MB must be cleaned.

The event search system 300 may track the memory usage by each of rules 330-$n$ running in parallel, sort rules 330-$n$ by high to low memory usage, and then process the rules 330-$n$, one at a time. The event search system 300 may determine that the size of the part of memory allocated for the set of events satisfying one or more the rules 330-$n$ exceeds a predetermined threshold. On a per rule basis, the event search system 300 may drop the oldest memory allocation first by removing the oldest event in the set of events related to a particular rule 330-$n$ and releasing a portion of the memory allocated for the oldest state. When at least N bytes (a minimum amount of the memory to free when the predetermined threshold is reached) are reclaimed as clean, the event search system 300 may stop cleaning the memory.

In another example embodiment, the event search system 300 may determine that the size of the part of memory allocated for a subset of the set of events exceeds a predetermined threshold. The subset may include events corresponding to the same rule 330-$n$ of the sequence of rules 330-$n$. In response to this determination, the event search system 300 may remove the oldest event in the subset from the set of events and release a portion of the memory allocated for the oldest event.

Thus, the oldest events and states corresponding to the same rule can be systematically removed from the memory until the amount of the memory occupied by events and states is reduced to below the predetermined threshold. If removing a predetermined number of the oldest events and states corresponding to the same rule does not result in reducing the memory to below the predetermined threshold, the event search system 300 may move to the next rule and remove the oldest events and states corresponding to that rule.

In other example embodiment, the event search system 300 may also keep track of the amount of memory shared between some of the rules 330-$n$. For example, two of the rules 330-$n$ may store the same event in memory. The event search system 300 may determine that the set of events includes a first event and a second event, in which the first event and the second event are the same and correspond to different rules in the sequence of rules. In response to this determination, the event search system 300 may release a part of the memory allocated to the first event or the second event.

The amount of the memory occupied by the states and events may be continually cleaned to avoid completely filling the memory and causing a pause in service provision.

Figure 5:
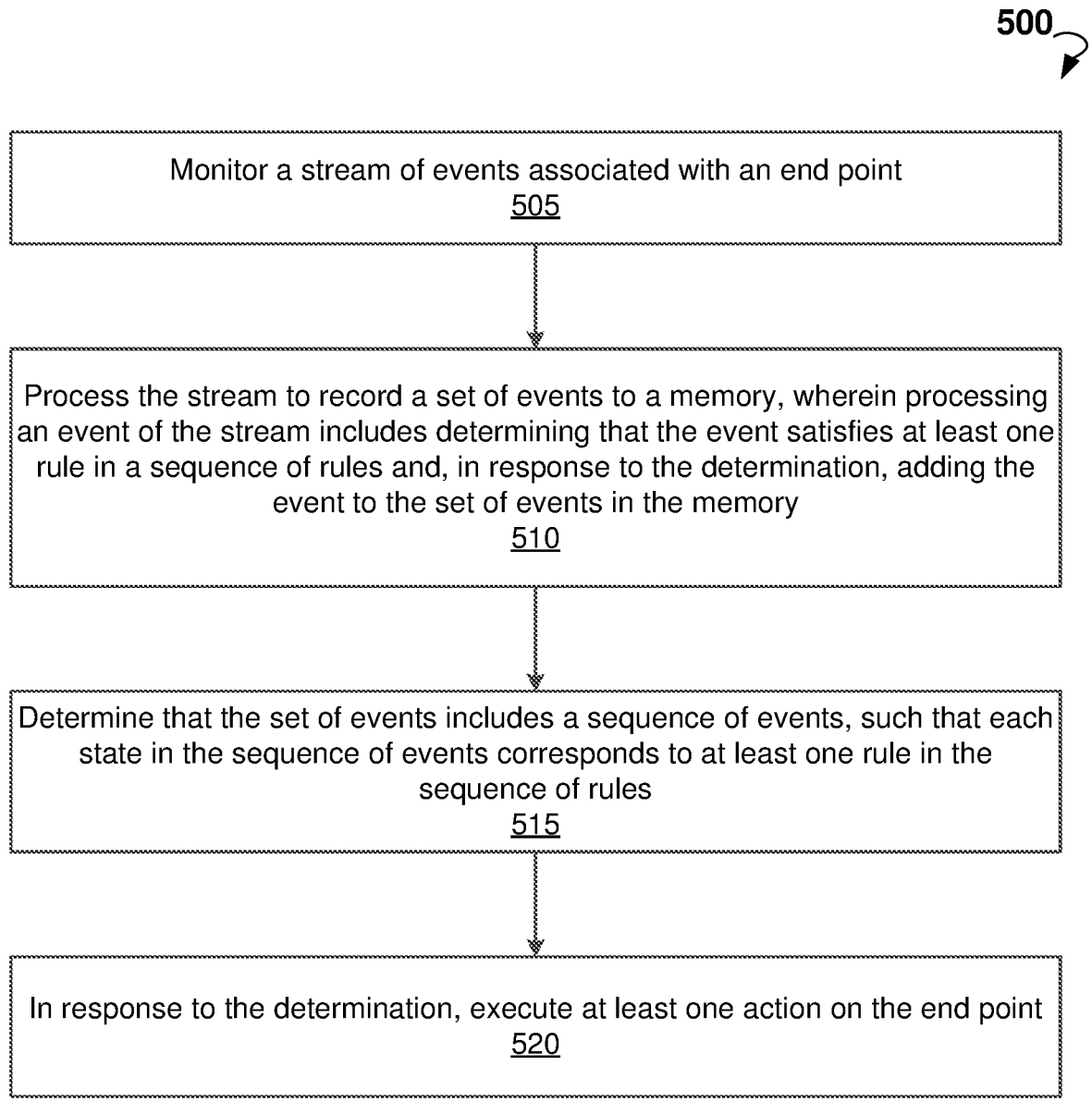
FIG. 5 is a flow chart of an example method for preventing malicious behavior of an end point, according to some example embodiments.

FIG. 5 is a flow chart of an example method for preventing malicious behavior of an end point, according to some example embodiments. The method 500 can be performed in an end point 100 illustrated in FIG. 1 by the event search system 150 of the end point 100. Notably, the steps recited below may be implemented in order other than described and shown in the FIG. 5. Moreover, the method 500 may have additional steps not shown herein, but which can be evident to those skilled in the art from the present disclosure.

The method 500 may commence with monitoring, in block 505, a stream of events associated with the end point. The end point may include one of the following: a personal computer, a server, a network device, an IOT device, and so forth. The method 500 may further include processing, in block 510, the stream to record a set of events to a memory. Processing an event of the stream may include determining that an event satisfies at least one rule in a sequence of rules and, in response to the determination, adding the event to the set of events in the memory. Prior to processing the events, the events may be enriched with information concerning a process associated with the event.

The method 500 may further include determining, in block 515, that the set of events includes a sequence of events. Each state in the sequence of events may correspond to at least one rule in the sequence of rules. Events in the sequence of events may be ordered by timestamps corresponding to the events and an order of the events in the sequence of events may correspond to an order of rules in the sequence of rules. The event may include one or more of the following: an attempt to access a computing system via a port, an indication of a process started on the end point, an indication of starting a new network connection to another computing system, and one of an opening, a creating, a modifying a file on the end point, and so forth. In some example embodiments, method 500 may further include scoping the set of events through a maxspan field to determine whether the set of events occurs within a predetermined time span set in the maxspan field.

The method 500 may continue with executing, in block 520, at least one action on the end point in response to the determination that the set of events includes the sequence of events. The at least one action may include one or more of the following: shutting down a process on the end point, deleting a file on the end point, issuing an alert message, generating a report based on the sequence of events, and so forth.

In some example embodiments, prior to the execution of the at least one action, fields may be extracted from events in the sequence of events and further fields may be extracted from rules in the sequence of rules. Based on the fields and the further fields, a type of the at least one action may be determined.

The method 500 may optionally include determining that the set of events includes a first event and a second event. The first event and the second event may be the same and may correspond to different rules of the sequence of rules. In response to the determination that the set of events includes the first event and the second event, a part of the memory allocated for the first event or the second event may be released.

The method 500 may optionally include determining that a size of a part of memory allocated for the set of events exceeds a predetermined threshold. In response to the determination that the size of the part of memory allocated for the set of events exceeds the predetermined threshold, the oldest event in the set of events can be removed and a portion of the memory allocated for the oldest state can be released.

The method 500 may optionally include determining that a size of a part of memory allocated for a subset of the set of events exceeds a predetermined threshold. The subset may include events corresponding to the same rule of the sequence of rules. In response to this determination, the oldest event in the subset may be removed from the set of events and a portion of the memory allocated for the oldest event may be released.

Figure 6:
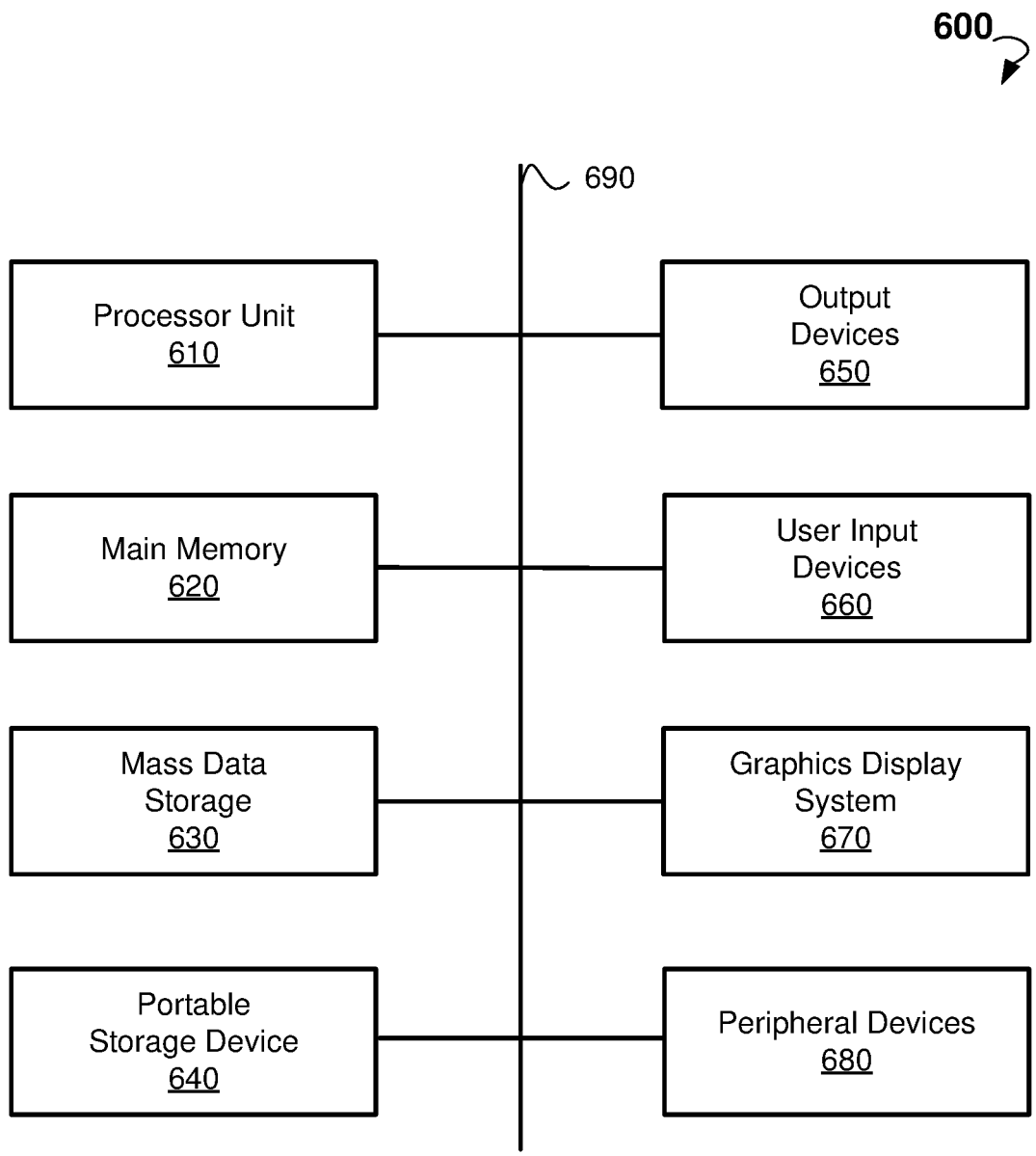
FIG. 6 is an example computer system that can be used to implement some embodiments of the present disclosure.

FIG. 6 illustrates an exemplary computer system 600 that may be used to implement some embodiments of the present disclosure. The computer system 600 of FIG. 6 may be implemented in the contexts of the end point 100 shown in FIG. 1. The computer system 600 of FIG. 6 includes one or more processor units 610 and a main memory 620. The main memory 620 stores, in part, instructions and data for execution by the processor units 610. The main memory 620 stores the executable code when in operation, in this example. The computer system 600 of FIG. 6 further includes a mass data storage 630, a portable storage device 640, output devices 650, user input devices 660, a graphics display system 670, and peripheral devices 680.

The components shown in FIG. 6 are depicted as being connected via a single bus 690. The components may be connected through one or more data transport means. The processor unit 610 and the main memory 620 are connected via a local microprocessor bus, and the mass data storage 630, the peripheral device(s) 680, the portable storage device 640, and the graphics display system 470 are connected via one or more input/output (I/O) buses.

The mass data storage 630, which can be implemented with a magnetic disk drive, solid state drive, or an optical disk drive, is a non-volatile storage device for storing data and instructions for use by the processor unit 610. The mass data storage 630 stores the system software for implementing embodiments of the present disclosure for purposes of loading that software into the main memory 620.

The portable storage device 640 operates in conjunction with a portable non-volatile storage medium, such as a flash drive, floppy disk, compact disk, digital video disc, or Universal Serial Bus storage device, to input and output data and code to and from the computer system 600 of FIG. 6. The system software for implementing embodiments of the present disclosure is stored on such a portable medium and input to the computer system 600 via the portable storage device 640.

The user input devices 660 can provide a portion of a user interface. The user input devices 660 may include one or more microphones; an alphanumeric keypad, such as a keyboard, for inputting alphanumeric and other information; or a pointing device, such as a mouse, a trackball, stylus, or cursor direction keys. The user input devices 660 can also include a touchscreen. Additionally, the computer system 600 as shown in FIG. 6 includes the output devices 650. Suitable output devices 650 include speakers, printers, network interfaces, and monitors.

The graphics display system 670 can include a liquid crystal display or other suitable display device. The graphics display system 670 is configurable to receive textual and graphical information and process the information for output to the display device.

The peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer, a handheld computer system, a telephone, a mobile phone, a smartphone, a laptop computer, a mobile computer system, a workstation, a tablet, a phablet, a server, a minicomputer, a mainframe computer, a wearable device, or any other computer system. The computer system 600 may also include different bus configurations, networked platforms, multi-processor platforms, and the like. Various operating systems may be used including UNIX®, LINUX®, WINDOWS®, MAC OS®, PALM OS®, QNX®, ANDROID®, IOS®, CHROME®, TIZEN®, and other suitable operating systems.

The processing for various embodiments may be implemented in software that is cloud-based. In some embodiments, the computer system 600 is implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, systems and methods for preventing malicious behavior of an end point are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for preventing malicious behavior of an end point, the method comprising, in real time:
    monitoring a stream of events associated with the end point;
    processing the stream to record a set of events to a memory, wherein processing an event of the stream includes:
        determining that the event satisfies at least one rule in a sequence of rules; and
        in response to the determination, adding the event to the set of events in the memory;
    determining that the set of events includes a sequence of events, each state in the sequence of events corresponding to at least one rule in the sequence of rules; and
    in response to the determination, executing at least one action on the end point.

2. The method of claim 1, wherein events in the sequence of events are ordered by timestamps corresponding to the events and an order of the events in the sequence of events corresponds to an order of rules in the sequence of rules.

3. The method of claim 1, wherein the event includes one or more of the following: an attempt to access a computing system via a port, an indication of a process started on the end point, an indication of starting a new network connection to another computing system, and one of an opening, a creating, and a modifying a file on the end point.

4. The method of claim 1, wherein the at least one action includes one or more of the following: shutting down a process on the end point, deleting a file on the end point, issuing an alert message, and generating a report based on the sequence of events.

5. The method of claim 1, further comprising, prior to the processing the events, enriching the events with information concerning a process associated with the event.

6. The method of claim 1, further comprising, prior to the executing the at least one action:
    extracting fields from events in the sequence of events and further fields from rules in the sequence of rules; and
    determining, based on the fields and the further fields, a type of the at least one action.

7. The method of claim 1, further comprising:
    determining that the set of events includes a first event and a second event, wherein the first event and the second event are same and correspond to different rules of the sequence of rules; and
    in response to the determination, releasing a part of the memory allocated for the first event or the second event.

8. The method of claim 1, further comprising:
    determining that a size of a part of memory allocated for the set of events exceeds a predetermined threshold; and
    in response to the determination, removing an oldest event in the set of events and releasing a portion of the memory allocated for the oldest state.

9. The method of claim 1, further comprising:
    determining that a size of a part of memory allocated for a subset of the set of events exceeds a predetermined threshold, wherein the subset includes events corresponding to the same rule of the sequence of rules; and
    in response to the determination, removing an oldest event in the subset from the set of events and releasing a portion of the memory allocated for the oldest event.

10. The method of claim 1, wherein the end point includes one of the following: a personal computer, a server, a network device, and an Internet-of-Things device.

11. A system for preventing malicious behavior of an end point, the system comprising:
    at least one processor; and
    a memory communicatively coupled to the processor, the memory storing instructions executable by the at least one processor to perform a method comprising:
        monitoring, in real time, a stream of events associated with the end point;
        processing the stream to record a set of events to a memory, wherein processing an event of the stream includes:
            determining that the event satisfies at least one rule in a sequence of rules; and
            in response to the determination, adding the event to the set of events in the memory;
        determining that the set of events includes a sequence of events, each state in the sequence of events corresponding to at least one rule in the sequence of rules; and
        in response to the determination, executing at least one action on the end point.

12. The system of claim 11, wherein events in the sequence of events are ordered by timestamps corresponding to the events and an order of the events in the sequence of events corresponds to an order of rules in the sequence of rules.

13. The system of claim 11, wherein the event includes one or more of the following: an attempt to access a computing system via a port, an indication of a process started on the end point, an indication of starting a new network connection to another computing system, and one of an opening, a creating, and a modifying of a file on the end point.

14. The system of claim 11, wherein the at least one processor is further configured to scope the set of events through a maxspan field to determine whether the set of events occurs within a predetermined time span set in the maxspan field.

15. The system of claim 11, wherein, prior to the processing the events, the at least one processor is configured to perform the following: enriching the events with information concerning a process associated with the event.

16. The system of claim 11, wherein, prior to the executing the at least one action, the at least one processor is configured to perform the following:
    extracting fields from events in the sequence of events and further fields from rules in the sequence of rules; and
    determining, based on the fields and the further fields, a type of the at least one action.

17. The system of claim 11, wherein the at least one processor is further configured to:
    determine that the set of events includes a first event and a second event, wherein the first event and the second event are same and correspond to different rules of the sequence of rules; and
    in response to the determination, release a part of the memory allocated for the first event or the second event.

18. The system of claim 11, wherein the at least one processor is further configured to:
    determine that a size of a part of memory allocated for the set of events exceeds a predetermined threshold; and
    in response to the determination, remove an oldest event in the set of events and releasing a portion of the memory allocated for the oldest state.

19. The system of claim 11, wherein the at least one processor is further configured to:
    determine that a size of a part of memory allocated for a subset of the set of events exceeds a predetermined threshold, wherein the subset includes events corresponding to the same rule of the sequence of rules; and
    in response to the determination, remove an oldest event in the subset from the set of events and releasing a portion of the memory allocated for the oldest event.

20. A non-transitory computer-readable storage medium having embodied thereon instructions, which when executed by at least one processor, perform steps of a method, the method comprising:
    monitoring, in real time, a stream of events associated with an end point;
    processing the stream to record a set of events to a memory, wherein processing an event of the stream includes:
        determining that the event satisfies at least one rule in a sequence of rules; and
        in response to the determination, adding the event to the set of events in the memory;
    determining that the set of events includes a sequence of events, each state in the sequence of events corresponding to at least one rule in the sequence of rules; and
    in response to the determination, executing at least one action on the end point.

* * * * *